UNITED STATES PATENT OFFICE 2,647,146

PROCESS FOR THE PREPARATION OF DIPRIMARY DIAMINES

Paul Arthur, Jr., Wilmington, Del., assignor to E. I. du Pont de Nemours and Company, Wilmington, Del., a corporation of Delaware No Drawing. Application July 1, 1949, Serial No. 102,713

2 Claims. (Cl. 260—583)

This invention relates to a new process for the preparation of long chain alpha,omega-diamines.

Long chain diamines are of particular economic importance as intermediates in the preparation of condensation polymers such as nylon. These diamines are generally prepared from dibasic acids through various intermediates. Furthermore, available diamines are in general available in large quantities only from those acids which are readily available, e. g. by the oxidation of naturally occurring aliphatic and cyclic materials.

This invention has as an object the preparation of new diamines. A further object is the provision of a new process for the preparation of diamines. Other objects will appear hereinafter.

These objects are accomplished by the invention wherein a dinitrile of the formula

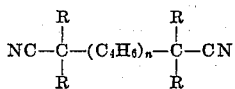

wherein $n$ is an integer of 1–25, $C_4H_6$ is a butadiene unit, and the R's are hydrocarbon radicals, generally saturated radicals of 1–6 carbons, is hydrogenated to the diprimary diamine of the formula

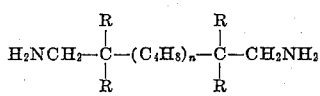

wherein $n$ and R are as above by contacting the dinitrile with hydrogen in the presence of a hydrogenation catalyst, e. g. a noble metal catalyst (platinum or palladium) or copper chromite promoted with magnesium, cadmium or barium preferably in the presence of ammonia at superatmospheric hydrogen pressures.

The dinitriles used for hydrogenation to yield the diamines are obtained by the reaction of an azonitrile of the general structure

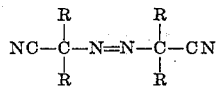

wherein the R's are hydrocarbon radicals, generally saturated hydrocarbon radicals aliphatic in character, i. e., aliphatic or cycloaliphatic, and of 1 to 6 carbons with butadiene.

The following examples in which parts are by weight are illustrative of the invention.

EXAMPLE I

Fifty parts of a dinitrile prepared by the reaction of 120 parts of alpha,alpha'-azodiisobutyronitrile and 400 parts of butadiene was dissolved in 100 parts of cyclohexane. Four parts of palladium on charcoal, 15 parts of nickel-on- kieselguhr, and 52 parts of liquid ammonia was added and the mixture was reduced at 400 atm. of pressure of hydrogen for 4 hours at 120° C. and then for 10 hours at 250° C. at 950 atm. The catalysts were filtered off and after removal of the solvent there remained 32 parts of a very cloudy but colorless oil insoluble in water but soluble in dilute acetic acid.

Analysis

Found: Molecular weight, 439; C, 78.86%; H, 14.11%; N, 6.67%.
Calculated for $H_2N-CH_2-C(CH_3)_2-$
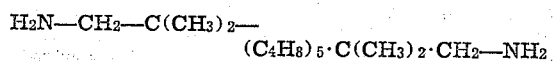

Molecular weight, 424; C, 79.24%; H, 14.26%; N, 6.60%.

EXAMPLE II

A total of 150 parts of a higher molecular weight (circa 800–1000) polybutadiene dinitrile prepared by the reaction product of butadiene with 30% of its weight of alpha,alpha'-azodiisobutyronitrile and heated 16 hours under vacuum at 100° C. to remove lower molecular weight products was reduced by the general procedure of Example I for 4 hours at 120° C. under 400 atm. and 12 hours at 260° C. under 600 atm. to yield 81 parts of a soft low-melting, white solid.

Analysis

Found: Molecular weight, 815; N, 2.87%; N as $NH_2$, 2.96%; neutral equivalent, 474; iodine number, 5.
Calculated for molecular weight (from N analysis), 980; neutral equivalent, 490.

The unsaturated dinitriles which are hydrogenated to give the diamines of this invention are obtained by the reaction of butadiene with an azo compound which have an acyclic azo, $-N=N-$, group bonded to different, i. e., discrete, carbons which are non-aromatic, i. e., aliphatic in character, i. e., aliphatic or cycloaliphatic and tertiary, i. e., attached to three other carbons by single valences, one of which other carbons is the carbon of a cyano, —CN, group. A subclass, preferred for reasons of availability and greater freedom from complications in preparation and reaction, is that of azo compounds wherein the acyclic azo group is attached by each valence to a cyanohydrocarbon radical aliphatic in character wherein the cyano group is on tertiary carbon joined to the azo group. A more restricted class is that of azo nitriles having two cyano groups each attached by an alkylidene radical to the azo group. In general, for good results the azonitriles are of the formula

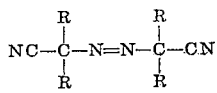

in which the R groups are hydrocarbon radicals of 1-6 carbons and preferably alkyl radicals of 1-4 carbons. Thus there may be employed alpha,alpha'-azodiisobutyronitrile, alpha,alpha'-azobis(alpha,gamma-dimethylvaleronitrile, alpha,alpha'-azobis(alpha - methylenanthonitrile), alpha,alpha-azobis(alpha - methylbutyronitrile), alpha,alpha' - azobis(alpha - ethylbutyronitrile), alpha,alpha' - azobis(alpha-phenylpropionitrile), alpha,alpha' - azobis(alpha - cyclopropylpropionitrile), alpha,alpha'-azobis(alpha - cyclohexylpropionitrile), alpha,alpha' - azobis(alpha - isopropyl-beta-methylbutyronitrile), alpha,alpha'-azobis(alpha,gamma - dimethylcapronitrile), alpha,alpha'-azobis(alpha-n-butyl capronitrile), alpha,alpha' - azobis(alpha - isobutyl - gamma-methylvaleronitrile), alpha,alpha'-azobis(alpha-methyl-gamma-carboxybutyronitrile) and the corresponding salts such as the sodium salt of the carboxy group, alpha,alpha'-azobis(alpha-methyl - beta - methoxypropionitrile), alpha,alpha' - azobis(alpha - methyl - gamma - diethylaminobutyronitrile), alpha,alpha'-azobis(alpha-methyl-delta-piperidinovaleronitrile), 1,1'-azodicyclohexanecarbonitrile, 1,1' azodicycloheptylcarbonitrile, 1,1' - azobis(3 - methylcyclopentanecarbonitrile), 1,1' - azobis(2,4 - dimethylcyclohexanecarbonitrile), and the azonitrile derived from camphor (1,1'-azodicamphanecarbonitrile) by the methods subsequently described.

The azo nitriles may be prepared by the process described by Thiele and Heuser, Ann. 290, 1-43 (1896); Hartmann, Rec. trav. Chim. 46, 150-153 (1927); Dox, J. Am. Chem. Soc. 47, 1471-1477 (1925), or by a particularly convenient method (that of Alderson and Robertson, Ser. No. 756,586, filed March 22, 1947) wherein hydrazine is reacted with a ketone to form an azine which is reacted with excess hydrogen cyanide containing less than 50% of water to give the hydrazonitrile which is readily oxidized by chlorine in an aqueous medium to give the azonitrile.

The reaction is generally carried out under superatmospheric pressure at temperatures of 50-150° C. The azonitrile is present in amounts of at least 5% and preferably 10-100% based on the weight of butadiene. The structure of the products obtained by this reaction are represented by the formula

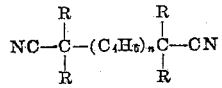

wherein $n$ is an integer of 1-25 units and the recurring C₄H₆ radical may have the structures of

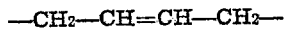

or

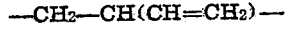

The former recurring unit is present more often than the latter, e. g. in a ratio of 80-20. The preparation and properties of these compounds are more completely described in the copending application of Donald C. Pease, Serial No. 102,438, filed June 30, 1949, now U. S. Patent 2,561,068. Preferably those having 2-16 butadiene units (value of $n$) are employed and of these those having values of 5 to 10 are more readily obtained and preferred.

The diamines of this invention are obtained by the hydrogenation of the unsaturated dinitriles. Any conventional hydrogenation procedures may be employed which will reduce the nitrile groups and the ethylenic linkages. Preferably the reduction is carried out with a palladium and nickel catalyst in the presence of ammonia under superatmospheric conditions. Also useful is copper-chromite catalyst promoted with various metals such as magnesium, cadmium or barium. In general catalytic reduction requires temperatures of 180-300° C. under pressure of hydrogen of the order of 200-5000 atmospheres. Sodium in alcohol may be used to reduce the nitrile groups to form the corresponding unsaturated diamine.

The diamines obtained by the process of this invention are particularly useful in the preparation of polyamides, particularly the preparation of polyamides of diamines of the general formula

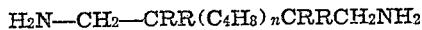

where R is an alkyl of 1-4 carbons and $n$ is an integer of at least 1 and preferably of 2-16. When high molecular weight diamines, e. g. where $n=8-12$, are used in the preparation of polymers the polyamides or polyureas have increased water resistance and improved insulating properties.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of diprimary diamines wherein a dinitrile having two cyano, —CN, groups directly attached, each through —C(CH₃)₂— radical to the termini of a chain composed of from 5 to 15 butadiene units is hydrogenated by means of hydrogen at a pressure of 200-5000 atmospheres and at a temperature of 180-300° C. in the presence of ammonia and a palladium and nickel catalyst to a diprimary diamine having two H₂NCH₂ groups each attached through a —C(CH₃)₂— radical to the termini of a chain of from 5 to 15 dihydrobutadiene units and said diamine is recovered.

2. A process for the preparation of diprimary diamines wherein a dinitrile having two cyano, —CN, groups directly attached, each through a —C(CH₃)₂— radical to the termini of a chain composed of from 5 to 15 butadiene units of the class consisting of the —CH₂—CH=CH—CH₂— and —CH₂—CH(CH=CH₂)— units is hydrogenated by means of hydrogen at a pressure of 200-5000 atmospheres and at temperature of 180-300° C. in the presence of ammonia and a nickel palladium hydrogenation catalyst to a diprimary diamine having two H₂NCH₂ groups each attached through —C(CH₃)₂— radical to the termini of a chain of from 5 to 15 dihydrobutadiene units of the class consisting of the —CH₂—CH₂—CH₂—CH₂— unit and the $$-CH_2-CH- \atop |\atop CH_2CH_3$$

unit and said diamine is recovered.

PAUL ARTHUR, JR.

References Cited in the file of this patent

UNITED STATES PATENTS

| Number | Name | Date |
|---|---|---|
| 2,132,388 | Berchet | Oct. 11, 1938 |
| 2,139,679 | Hardy | Dec. 13, 1938 |
| 2,190,770 | Carothers | Feb. 20, 1940 |
| 2,245,129 | Greenwalt | June 10, 1941 |
| 2,388,034 | Biggs | Oct. 30, 1945 |
| 2,460,733 | Bruson et al. | Feb. 1, 1949 |

FOREIGN PATENTS

| Number | Country | Date |
|---|---|---|
| 570,532 | Great Britain | July 11, 1945 |
| 612,712 | Great Britain | Nov. 17, 1948 |
| 61,577 | Denmark | Nov. 1, 1943 |
| 52,489 | Netherlands | May 15, 1942 |
| 57,903 | Netherlands | July 15, 1946 |
| 583,565 | Germany | Sept. 21, 1933 |

OTHER REFERENCES

Polyamides in Germany: Intermediates, Modern Plastics, March 1948, p. 172.

Beilstein, vol. 4, 2nd supp.; Edwards Bros. Ann Arbor, Michigan, 1943, page 713.